July 10, 1923.
W. H. KERN
1,461,485
SINGLE TUBE PNEUMATIC TIRE
Filed March 4, 1922
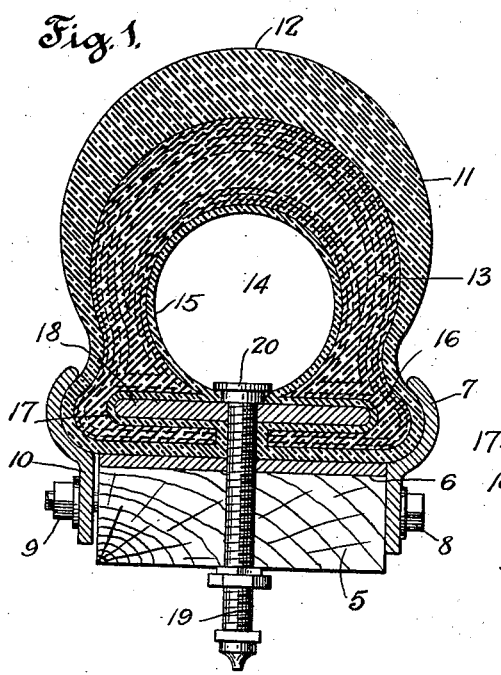
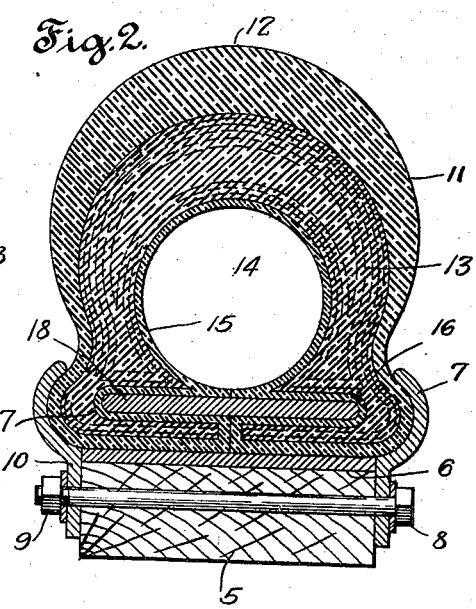
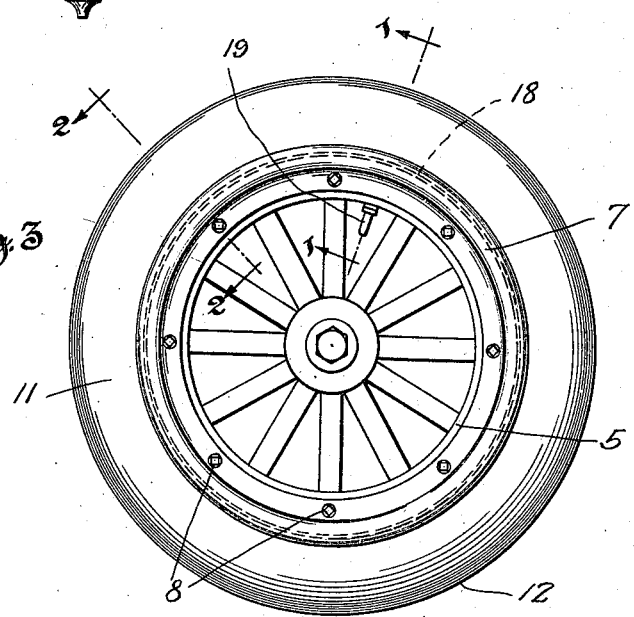
INVENTOR
William H. Kern
BY
ATTORNEY Patented July 10, 1923.

1,461,485

UNITED STATES PATENT OFFICE.

WILLIAM H. KERN, OF JERSEY CITY, NEW JERSEY.

SINGLE-TUBE PNEUMATIC TIRE.

Application filed March 4, 1922. Serial No. 540,992.

*To all whom it may concern:*

Be it known that I, WILLIAM H. KERN, a citizen of the United States, and resident of the city of Jersey City, county of Hudson, State of New Jersey, have invented new and useful Improvements in Single-Tube Pneumatic Tires, of which the following is the specification.

The device the subject of this invention, I call a single tube pneumatic tire for the reason that while it is not provided with an inner tube, it is provided with means through which air may be forced into the tire and within the tire construction itself, I provide an air tight compartment and sealing means therefor, which means will effectually retain the parts of the tire together.

Another object of this invention is to increase the rigidity of the tire and to provide supplemental means for securing the tire to the rim, a means that will prevent the tire chaffing on the rim and that will also prevent the tire opening or spreading, due to a loosely fitting rim.

Another object of the invention is to provide a tire with side walls so thick that rim cut will not be possible and yet one wherein resiliency is maintained and another object of the invention is to provide a tire that may be employed with a rim having exceedingly small outwardly extending flanges.

Another advantage is in that rim cuts are practically eliminated.

All of these objects and advantages and the details of the construction of my device will be fully set forth as the specification progresses and the accompanying drawing should be referred to for a complete understanding of the specification which follows:

In the drawing:—

Fig. 1, is an enlarged sectional view of a felloe, rim and tire and rim retaining means, the air valve is shown in elevation.

Fig. 2, is a sectional view of the tire, taken on the line 2—2 in Fig. 3.

Fig. 3, is a side elevation of the wheel fitted with my tire.

Similar reference numerals indicate like parts in all the figures where they appear.

While I appreciate that all-metal or disk wheels are in quite common use and while I desire it understood that my tire may be used with such wheels, I have in the drawing shown the tire mounted upon a wooden wheel and at 5, I have shown a wooden rim or felloe provided with an ordinary felloe band 6.

At 7, I show an annular rim and clamping member which may be secured to the inner side of the rim 5 and may be considered as permanent therewith if desired.

A series of bolts 8 extend through the rim or band member 7 and through the felloe or rim 5 and are each provided with a nut as shown at 9. A second rim or clamping member 10 is arranged upon the bolts and is adapted to be moved inward to engage upon the outer surface of the rim of felloe 5. Both of these rim or clamping members 7 and 10 may be movable toward and away from each other and it is between these members that I engage my tire which I am about to describe.

The tire consists of a body made up of a vulcanized rubber exterior as shown at 11, the outer periphery of which may be thickened as shown 12 to provide a tread and the innermost portion of which may be quite thin.

Arranged next to the outer rubber portion is the body of the tire, made up of layers of friction or gum-impregnated fabric or cord and this portion shown at 13 may be of any conventional shape, size or material. Within the body 13, I provide a chamber 14, lined with rubber as shown at 15 and of circular cross section.

Communicating with or adjacent to the chamber 14 is an inner angular, oblong chamber 16, also lined with rubber as shown at 17 and it will be noted that the exterior and interior rubber of my tire forms a continuous strip and it will be also noted by referring to Fig. 2 that the sides of my tire adjacent the rim or felloe are not joined together permanently.

In the chamber 16, I arrange a metallic band 18 which may be a continuous hoop of sufficient thickness to withstand the service to which it is to be subjected and through this hoop and through the felloe and felloe band I extend a valve stem 19 having a button head as shown at 20.

The valve stem 19 extends through the tire, through the band 18, through the felloe band 6 and felloe or rim 5 and the edges of the inner wall of the chamber 14 are engaged under the button head 20.

It will be noted in Fig. 2 that the sides of the tire are brought into close approximation, the means for accomplishing this are as follows:

My tire is formed as a shoe of a diameter to fit closely upon the felloe band 6, before being placed on the band 6, the hoop or member 18 is placed in the recess 16 and the sides of the tire are brought together as closely as possible.

The clamping ring 7 is in place on the rim 5, though not necessarily in close engagement therewith. The valve stem is passed through the valve stem perforation in the felloe and felloe band and thereafter the clamping rim member 10 is placed in position upon the bolts 8 and the nuts 9 are screwed down until the tire is firmly engaged.

The clamping takes place between the clamp ring 7 and the band or member 18 on the one side and the clamp ring 10 and the band or member 18 on the other side and when the clamp rings are secured in position the sides of the tire will be so strongly secured between the metallic members 7, 10 and 18, that the chamber 14 will be air tight.

Air may then be pumped through the air valve 19 in the ordinary manner.

It is not believed that puncture can occur through the walls of this tire, but should the chamber 14 be punctured, the walls of the tire will support the vehicle for a considerable period of time and until a place is reached, where a repair can be made. A repair if such is ever necessary, may be made by merely placing a small piece of rubber or rubber impregnated fabric in the chamber 14 and over the puncture, after the withdrawal of the thing that caused the puncture. The sides of the punctured hole will come together sufficiently to prevent the patch blowing through.

The thickness of the walls of my tire will prevent rim cut even though the tire is punctured as the thick walls will prevent a bend in the tire sufficiently sharp to allow the rim to contact with the walls of the tire. It will appear quite obvious that modifications may be made within the scope of the appended claims without departing from the principle or sacrificing the advantages of the invention.

Having carefully and fully described my invention what I claim and desire to obtain by Letters Patent is as follows:

1. A single tube pneumatic tire having an air chamber therein, an auxiliary chamber therein and of a width greater than the diameter of said air chamber and nonelastic means in said auxiliary chamber for sealing said air chamber.

2. A single tube pneumatic tire having a tubular air chamber, a flattened auxiliary chamber communicating therewith, a flat metallic band within said auxiliary chamber and upon which the sides of said chamber are adapted to be compressed.

Signed at the city, county and State of New York, this 27th day of February, 1922.

WILLIAM H. KERN.